April 15, 1941.  L. B. COLLINS ET AL  2,238,677
SAMPLING MEANS
Filed Jan. 2, 1940
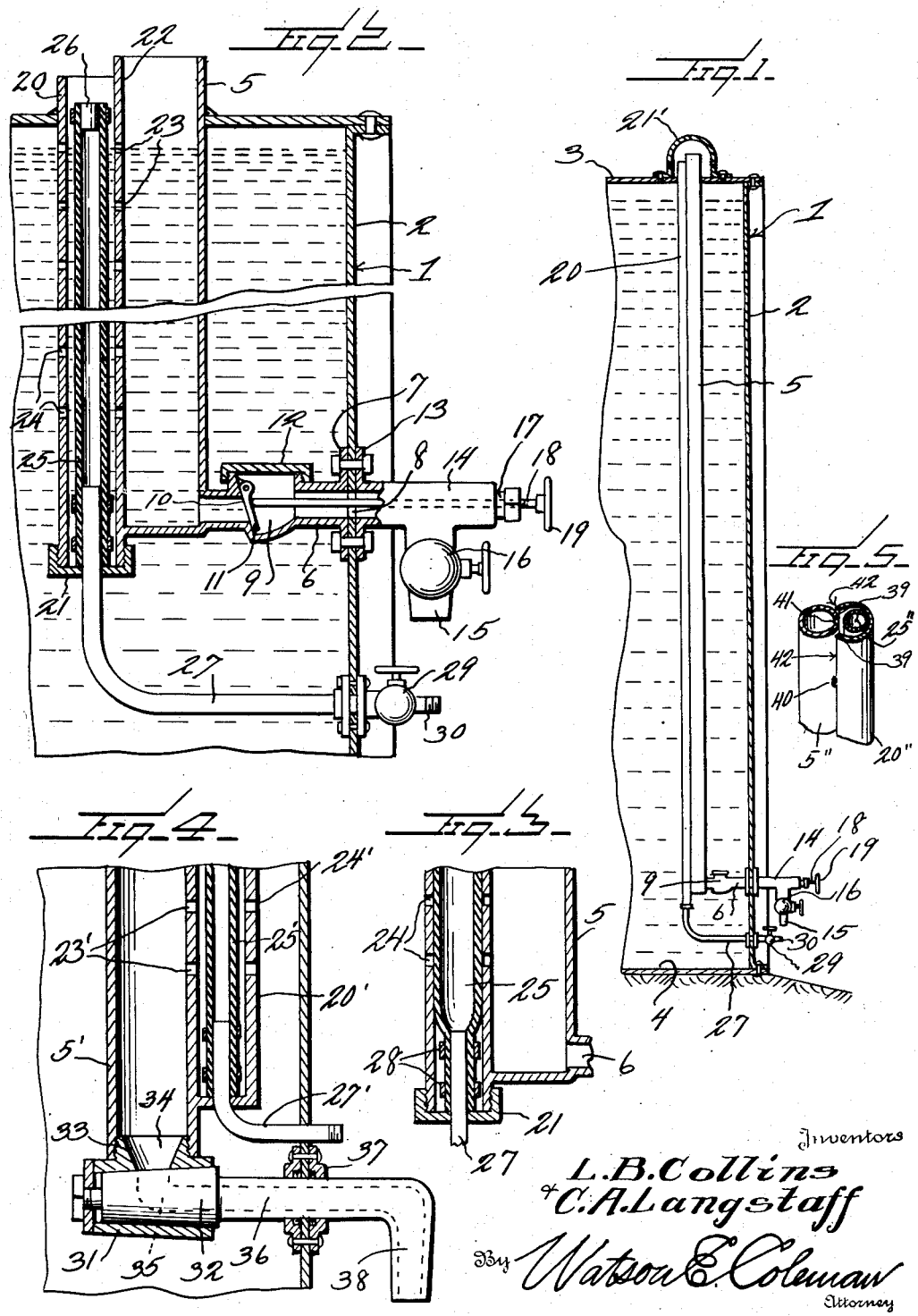
Inventors
L. B. Collins
& C. A. Langstaff
By Watson E. Coleman
Attorney Patented Apr. 15, 1941

2,238,677

UNITED STATES PATENT OFFICE 2,238,677

SAMPLING MEANS

Lawrence B. Collins, Orange, and Clinton A. Langstaff, Compton, Calif.

Application January 2, 1940, Serial No. 312,136

10 Claims. (Cl. 137—18)

This invention relates to improvements in sampling means or devices and pertains particularly to an improved means for taking samples from fluid receptacles into which are placed at different times quantities of fluids of different grades.

The present sampling device is designed primarily for use in association with oil storage tanks and has for its primary object to provide a means whereby there may be extracted from the tank a quantity of stored oil which will give an accurate cross section sample of the oil so that a determination may be readily made as to the grade of the contents of the tank which may have been made up from batches of oil of different grades.

Another object of the invention is to provide a device for extracting a sample of fluid from a storage tank, which is so designed that the fluid may flow into a receiver from different levels in the tank in such a manner that the contents of the tank will not be disturbed or stirred up, thus making it possible to obtain specimens of the fluid from a number of levels by which a determination may be made as to the average grade of the tank contents.

A further and more specific object of the invention is to provide in a sampling means for an oil storage tank, a vertically disposed sample receiving tube having a discharge outlet adjacent the lower end thereof, in association with a novel type of valve unit for introducing fluid into the tube at various levels and which comprises a tube integral with the sample tube and having fluid inlet openings at various levels and openings leading therefrom into the sample tube, with an expansible tube in the valve tube which may be inflated to close all of the openings when it is desired to draw off the fluid contained in the sample tube.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Figure 1 is a view illustrating in vertical section a portion of an oil storage tank showing disposed therein the sample removing means embodying the present invention.

Figure 2 is a view in vertical section through the sampling means embodying the present invention, on a scale enlarged from the scale used for Figure 1, the major portion of the sampling means being broken away.

Figure 3 is a detail view of the lower portion of the sample tube and valve tube showing the manner in which the inflatable tube in the valve tube is expanded to close the fluid apertures.

Figure 4 is a detail view showing a modification of the construction of the lower end of the sampling means.

Figure 5 is a view in perspective of a portion of a modified form of the sample pipe and attached tube.

Referring now more particularly to the drawing, the numeral 1 generally designates a fluid storage tank, such as is employed in oil producing countries for storing oil, and there is here shown a front wall 2 and top and bottom walls 3 and 4 for the tank.

The sampling means embodying the present invention comprises a sample receiving tube or pipe 5 which is disposed vertically in the tank, having its upper end extended through the top wall of the tank, as shown, and having its lower end in relatively close proximity to the bottom of the tank. The lower end of this pipe 5 has a lateral pipe extension 6 which may be provided at its free end with a flange 7 by which it can be secured to the inner side of the adjacent vertical wall 2 of the tank in alinement with the opening 8 which is formed through such wall. This pipe 6 is provided with a valve chamber 9, one side of which is formed to provide the inclined flap valve seat 10 against which bears the pivotally mounted flap valve 11. A removable cap 12 may be provided over the chamber 9 so that access may be had to the chamber and to the flap valve.

Upon the outer side of the tank there is secured by means of integral flanges 13 and in alinement with the opening 8 and the discharge pipe 6, an outer pipe 14 having a downwardly extending discharge spout 15 in which is a hand controlled valve 16 of suitable design which will facilitate the control of the passage of fluid through the spout 15. The outer end of the pipe 14 carries a packing gland 17 through which extends a rod 18, the rod being suitably threaded in the gland so that upon rotation it will be moved longitudinally inwardly or outwardly through the alined pipes 6 and 14 and the inner end of this rod is arranged to be brought to bear against the flap valve 11 whereby such valve may be held seated. A suitable means, such as a wheel 19, may be provided upon the rod 18 to facilitate turning the rod.

Extending longitudinally of the pipe 5 and integrally joined thereto is a tube 20, the lower end of which is closed by a cap 21 or other suitable means, while the upper end of the tube extends through the top of the tank, as shown in Figures 1 and 2. This tube 20 and the pipe 5 are open at their upper ends and in order to protect the same against the entrance of moisture or dirt, a cap 21' is mounted over the upper ends of the tubes and secured to the top wall of the tank, the cap having suitable air apertures therethrough to permit air to pass into and out of the cap and of the tubes. The tube 20 and pipe 5 may be initially formed as two tubular bodies having a dividing wall between them of the same thickness as the walls of the tube or, if desired, these two bodies may be made up of two separate pipes or tubes welded together. In either case, the intermediate or dividing wall between the pipe and tube, indicated by the numeral 22, is provided at spaced intervals throughout its length with fluid admission apertures leading from the tube 20 into the pipe 5 and the tube 20 is also provided with corresponding apertures 24 leading from its interior to the tank whereby fluid may pass from the tank into the tube and then from the tube through the aperture 23 into the pipe 5.

Within and extending throughout the length of the tube 20 which, in effect, constitutes one element of a valve, is an expansible tube 25 which is preferably formed of a suitable oil resisting rubber and which constitutes the other element of such valve. The expansible tube 25 is closed at its upper end, as indicated at 26, while its lower end has extended thereinto, one end of an air pipe 27 which passes through the cap 21 and is firmly secured within the expansible tube by means of clamp rings 28 or in any other manner which will prevent the expansible tube from slipping off of the end of the air pipe 27 when air under pressure is introduced into the expansible tube.

The air pipe 27, while it may be made of any suitable material, is preferably a small copper tube and it has its other end extended through the wall 2 of the tank to the outside thereof where it is coupled with a control valve 29 and this valve has a threaded connection 30 by means of which an air line may be coupled therewith for the introduction of air into the air pipe.

With the structure thus far described, the operation is as follows. The expansible tube 25 of the valve unit which controls the flow of fluid into the pipe 5, is, under normal conditions, contracted to its normal diameter and such normal diameter is materially less than the interior diameter of the tube 20 and thus fluid will be free to pass through the openings 24 and 23 into the pipe 5 from the various levels in the tank in which these openings lie. Thus, the sample pipe 5 will fill with the oil or other fluid in the tank in such way as to give a specimen from each of the elevations in which the apertures lie. The drawing off of the contents of the specimen pipe 5 is accomplished by opening the valves 11 and 16 but before these valves are open, air under pressure is introduced through the pipe 27 into the expansible tube 25 so that this tube will be expanded in the manner illustrated in Figure 3 to be pressed against the inner wall of the tube 20 and thus close the apertures 23 and 24. This will permit the contents of the pipe 5 to be drawn off through the spout 15 without allowing any additional fluid to enter the pipe from the tank. After the pipe has been emptied, the draw-off valve will be closed and then the expansible tube may be exhausted so that it will return to its former normal diameter and open the apertures 23—24 to permit the pipe 5 to again fill.

As will be readily apparent, since the pipe 5 has inlet apertures at different locations throughout its length and since the valve tube 20 also has apertures at spaced intervals throughout its length, when the expansible tube is exhausted of air, fluid will flow from the tank horizontally through the apertures and into the pipe 5 without creating any material disturbance of the fluid body in the tank and, therefore, an accurate representative sample will be obtained of the tank contents.

In Figure 4 there is shown a slight modification of the lower end structure of the sampling means illustrated in Figure 2. In this modified form, there is employed the vertical sample receiving pipe 5' along which extends the tube 20' forming an element of the valve unit through which fluid passes into the pipe 5'. In this tube is an expansible tube 25' and the wall between the tube 20' and pipe 5' has inlet apertures 23' while the outer wall of the tube 20' has inlet apertures 24'. The lower end of the expansible tube 25' has coupled therewith an air inlet pipe 27' by which air may be introduced into the expansible tube to enlarge the same when the pipe 5' is to be emptied. Thus, it will be seen that the major portion of this modified form is of the same construction as the form shown in Figure 2. In this modified form, the sample pipe is emptied through a valve unit which is coupled directly to its lower end. This valve unit comprises a valve body 31 which is bored to receive a tapered rotary plug 32. One side of the valve body 31 has a laterally extending exteriorly threaded nipple 33 which is threaded into the lower end of the pipe 5' and which has a passage 34 therethrough arranged to register with an end of a passage 35 which opens at one end through the side of the plug 32 and at its other end opens through the larger end of the plug into the tubular or pipe handle 36 which forms a draw-off means and which passes through a suitable packing 37 in the wall of the tank and terminates at its outer end in the laterally extending portion which constitutes a combined spout and handle 38.

It will be readily seen that in the use of the modified form of the invention, the sample tube 5' is emptied, after the expansible tube 25' is inflated to close the openings 23'—24', by rotating the pipe or tubular stem 36 so as to turn the plug into a position where the inner end of the passage 35 will register with the opening 34 and when in this position, the spout handle 38 will be directed downwardly for the discharge of the contents of the pipe 5' therethrough.

In Figure 5 a slightly altered or modified construction of the sample pipe and tube is shown, this figure illustrating only a portion of such parts of the invention so as to disclose the essential features of the same. In this modification the sample pipe is indicated by the numeral 5'' while the valve tube attached thereto is indicated by the numeral 20''. The valve tube 20'' consists initially of a section of a complete pipe, being cut away longitudinally throughout its length, and this cut away portion is disposed toward the tube 5" but is maintained with the edges 39 in spaced relation with the pipe 5" by the weld lugs 40. The portion of the pipe 5" which is directed into the open area or which is disposed between the edges 39 of the tube 20", is provided with a series of apertures 41 which may be in the form of elongated slots or in any other desirable form and within the valve tube 20" is disposed the expansible air tube 25" corresponding to the tubes 25 and 25' of the figures previously described. With this arrangement there are thus formed two substantially continuous fluid transfer passages or inlets 42 between the valve tube 20" and the sample pipe 5", which are disposed in close proximity to the apertures 41 of the sample pipe and, therefore, provide means for the fluid to pass, when the tube 25" is collapsed or unexpanded, directly past this tube to the apertures 41. Thus the tube 25" does not interfere at all with the free flow of fluid through the valve tube to the sample pipe. It will be understood that the same other structural features might be employed in association with this modified form of the invention illustrated in Fig. 5, as are shown in association with the forms of the invention shown in Figs. 1 and 4, and for this reason no detailed showing has been made of such parts.

While in Figures 2 to 4 inclusive, the valve tubes and the wall between each valve tube and the adjacent sample tube, have been illustrated as having circular apertures therethrough, it will be understood that longitudinally extending slots may be employed if desired.

From the foregoing it will be readily apparent that there has been disclosed herein a novel and simple means by which samples or specimens may be removed from a storage tank, such as an oil tank or the like, without stirring up the contents of the tank, thus enabling the sampler to obtain an accurate cross section sample of the tank contents. The device is so designed that the sample tube will always be filled and therefore, a sample can be obtained at any time without waiting or without having to manipulate the sampling device in any manner except to introduce air into the valve tube so as to close the inlet openings while the sample pipe is being emptied.

We claim:

1. A sample removing means for a fluid storage tank comprising a pipe disposed vertically within the storage tank and having its upper end open and located exteriorly of the tank, a valve controlled draw-off means for the lower end of the pipe, said pipe having a plurality of fluid admission apertures extending throughout its length, a valve means designed to facilitate the simultaneous opening or closing of said apertures, said valve means comprising a tubular casing extending longitudinally of said pipe and covering and having communication with said apertures, the tubular casing having a plurality of apertures extending longitudinally thereof for the admission of fluid thereinto from the tank, an expansible body within the tubular casing which when expanded completely fills the casing and closes the apertures thereof and the apertures of the pipe, and means for effecting the expansion of said body in the casing.

2. A fluid sample removing means for storage tanks, comprising a body disposed vertically within the tank and forming a pipe and a tube in parallel relation, means for admitting fluid from the tank into the tube at a plurality of points longitudinally of the tube, means for admitting fluid from the tube into the pipe at a plurality of longitudinally extending points, an expansible tube within the first tube and having a normal overall diameter smaller than the interior diameter of the first tube, means for introducing fluid under pressure in the expansible tube whereby the latter may be enlarged to completely fill the first tube, a drain pipe connected with the lower end of the first pipe and extending to the exterior of the tank, and a valve controlling the flow of fluid through the drain pipe.

3. A fluid sample removing means for storage tanks, comprising a body disposed vertically within the tank and forming a pipe and a tube in parallel relation, means for admitting fluid from the tank into the tube at a plurality of points longitudinally of the tube, means for admitting fluid from the tube into the pipe at a plurality of longitudinally extending points, an expansible tube within the first tube and having a normal overall diameter smaller than the interior diameter of the first tube, means for introducing fluid under pressure in the expansible tube whereby the latter may be enlarged to completely fill the first tube, a drain pipe connected with the lower end of the first pipe and extending to the exterior of the tank, a valve controlling the flow of fluid through the drain pipe, said first pipe and first tube having their upper ends extending to the outside of the tank and open to the atmosphere, and a shield cap covering said open ends.

4. Means for removing a sample from a fluid storage tank comprising a vertically disposed pipe within the tank, a tube extending vertically in the tank adjacent and paralleling the pipe, said tube having a longitudinally extending series of fluid inlet apertures in the wall thereof, means providing a plurality of fluid transfer apertures between the tube and the pipe and extending longitudinally of the pipe, a drain pipe extending from the lower end of the first pipe to the exterior of the tank, a discharge spout connected with the outer end of the drain pipe, a valve in the drain pipe controllable from the outer end thereof, a valve in said spout, a closed expansible tube in the first tube and having a normal overall diameter smaller than the interior diameter of the first tube and a pipe extending from the exterior of the tank into said expansible tube to facilitate introduction of air under pressure thereinto.

5. Means for removing a sample from a fluid storage tank comprising a vertically disposed pipe within the tank, a tube extending vertically in the tank adjacent and paralleling the pipe, said tube having a longitudinally extending series of fluid inlet apertures in the wall thereof, means providing a plurality of fluid transfer apertures between the tube and the pipe and extending longitudinally of the pipe, a valve body coupled with the lower end of said pipe and having a chamber for the reception of a rotary plug, a chambered rotary plug in said body chamber and having an outlet at one end, said rotary plug when in one position having its chamber in communication with the pipe, a tubular stem connected with the said one end of the rotary plug and extending through a wall of the tank and terminating exteriorly of the tank in a laterally directed spout which extends downwardly when the chamber of the plug is in communication with the first pipe, a closed expansible tube within the first tube, and a pipe leading from the exterior of the tank into said expansible tube by which the introduction of air under pressure into the expansible tube may be effected, said expansible tube having a normal unexpanded overall diameter less than the interior diameter of the first tube.

6. In a sample removing means for a fluid storage tank, a sample pipe adapted to be disposed vertically in the tank and to have fluid drawn off from its lower end, a valve tube comprising a longitudinal section of a pipe disposed parallel with the sample pipe and having longitudinally extending edges disposed in spaced relation with the sample pipe, means at spaced intervals along said edges coupling the edges with the wall of the adjacent sample pipe, said sample pipe having an aperture through the portion of the wall thereof lying between said edges to open into the valve tube, and an expansible tube lying within the valve tube and adapted to be inflated and expanded to substantially fill the valve tube and to close the aperture of the sample pipe.

7. In a sample removing means for a fluid tank, a sample pipe adapted to be disposed vertically in the tank and to have fluid drawn off from its lower end, a valve tube comprising a longitudinal section of a pipe disposed parallel with the sample pipe and having its longitudinally extending edges secured to the sample pipe, fluid inlet apertures arranged at spaced intervals longitudinally of said tube for admitting fluid into the tube from the tank, fluid inlet apertures in the wall of the sample pipe opening into the tube for admitting fluid from the tube to the sample pipe, and an inflatable tube lying within the valve tube and adapted to be inflated and expanded to substantially fill the valve tube to close the said apertures in the wall of the sample pipe.

8. A fluid sample removing means for tanks, comprising a body disposed vertically within the tank and forming a pipe and a tube in parallel relation, means for admitting fluid from the tank into the tube at a plurality of points longitudinally of the tube, means for admitting fluid from the tube into the pipe at a plurality of longitudinally spaced points, an expansible inflatable tube within the first tube and having a normal overall diameter smaller than the interior diameter of the first tube, means for introducing a fluid under pressure into the expansible tube whereby the latter may be enlarged to completely fill the first tube, a body forming a rotary valve housing having an open end and having a lateral tubular arm, the said arm being secured in the lower end of the pipe to receive fluid therefrom, a rotary plug in the housing having a passage opening at one end through the side of the plug and at the other end through an end of the plug, the said one end of the passage being adapted for communication with said lateral arm, a pipe connected at one end with the plug at the said open end of the housing and communicating with said passage and extending through and rotatably supported in the wall of the tank, said pipe at its other end being laterally directed to form a combined handle and discharge spout.

9. A sampling device for removing fluid from a receptacle, comprising a pipe adapted to be disposed vertically in the receptacle, an outlet at one end of the pipe, means for admitting fluid into the pipe from the receptacle at a plurality of points arranged longitudinally of the pipe, an inflatable body disposed longitudinally of said pipe in front of said fluid admitting means, and means retaining the inflatable body in operative position relative to the pipe, the said inflatable body upon inflation being held by the retaining means and operating to stop the admission of fluid into the pipe through said fluid admitting means to facilitate drawing off the contents of the pipe without permitting additional fluid to enter the same.

10. A sample removing means for a fluid storage tank, comprising a pipe disposed vertically within the tank and having its upper end open and located exteriorly of the tank, controlled draw-off means for the lower end of the pipe, said pipe having a plurality of fluid admission apertures arranged lengthwise thereof, an inflatable body disposed to extend over said apertures, and means for retaining the inflatable body in position over the apertures, said inflatable body functioning upon inflation and deflation to effect the simultaneous closing and opening of said apertures, and means for inflating and deflating the inflatable body.

LAWRENCE B. COLLINS.
CLINTON A. LANGSTAFF.